(No Model.)
T. J. HUBBELL.
Harrow.
No. 242,094. Patented May 24, 1881.
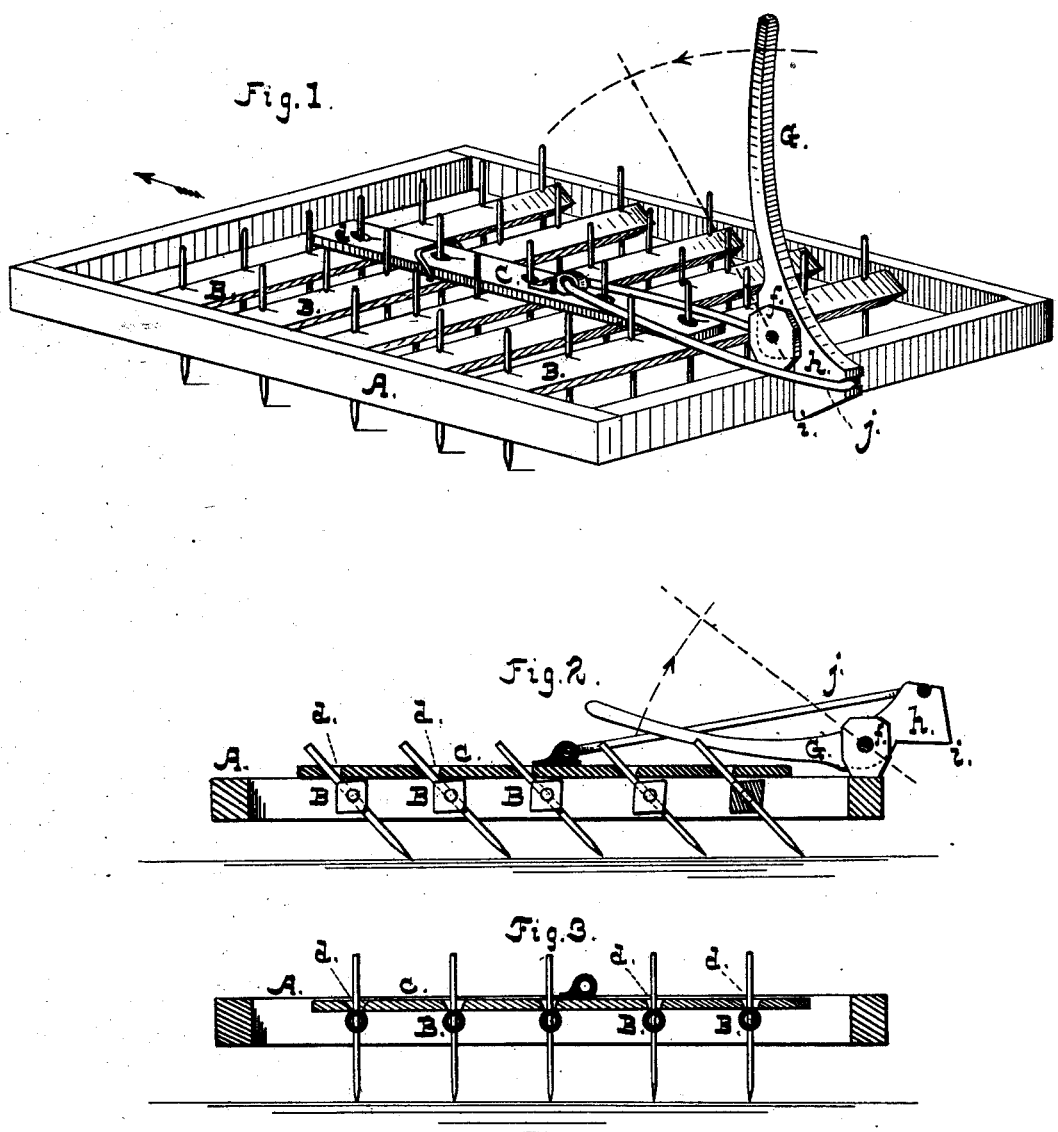
Witnesses:
W. Voit
Wm. F. Clark
Inventor:
Thomas J. Hubbell
By his Attys,
Boone & Osborn

UNITED STATES PATENT OFFICE.

THOMAS J. HUBBELL, OF MAYFIELD, CALIFORNIA.

HARROW.

SPECIFICATION forming part of Letters Patent No. 242,094, dated May 24, 1881.

Application filed March 5, 1881. (No model.)

*To all whom it may concern:*

Be it known that I, THOMAS J. HUBBELL, of Mayfield, in the county of Santa Clara and State of California, have invented certain new and useful Improvements in Harrows; and I do hereby declare that the following is a full, clear, and exact description thereof, reference being had to the accompanying drawings.

My invention relates to a self-cleaning harrow in which all the teeth can be simultaneously shifted from their vertical position to an angle pointing rearward, so that the dragging of the inclined teeth over the ground will strip them of any lodged weeds or other substance that may become entangled in them.

It consists, first, in mounting the bars in which the harrow-teeth are held on journals in the harrow-frame, so that each bar can be partially rotated; and, secondly, in connecting all the bars by means of a single transverse bar, and then connecting the said transverse bar with a lever at the rear of the harrow, so that by means of the lever all the tooth-bars can be turned simultaneously, so as to set the teeth in a raking or angular position, as hereinafter more fully described.

Referring to the accompanying drawings, Figure 1 is a perspective view of my improved harrow. Figs. 2 and 3 are longitudinal sections taken through the center of Fig. 1.

My harrow-frame A, I make in the form of a parallelogram, so that the tooth-carrying bars B B B can be journaled in its side timbers. These tooth-bars can be made of wood or metal. Usually I shall make them of gas-pipe or tubular iron, while the frame A is always made of wood. When I use gas-pipe or tubular bars I simply insert their ends in the holes in the side timbers, and keep them in place by means of pins, which pass through them close to the side timbers, as shown at Fig. 3. When I make them of wood I make a journal on each end, as shown at Fig. 2. The harrow-teeth are inserted through holes in the bars B, and made tight therein in the usual way, leaving their upper ends projecting above the bars. Transversely across the middle of these bars I place a bar, C, through which a hole, $d$, is made directly over the center of each bar B, so that the upper projecting end of the middle tooth on each bar will pass through the hole corresponding with it. The holes $d$ are made in the shape of a funnel, or largest at the top, so as to allow the teeth to change their angle in them.

At the middle of the rear timber of the frame A, and in line with the bar C, I secure two upward-projecting lugs, $ff$, between which I place and secure the lower end of a peculiar-shaped lever. This lever consists of a curved handle-bar, G, at its upper end, and an enlargement, $h$, at its lower end, which extends below the pivoted point or center about which the lever moves. This enlargement practically forms a cam or eccentric, and it has a shoulder, $i'$, which strikes and bears against the timber of the frame, below the standards or lugs $ff$ when the lever is standing in its vertical position. A link, $j$, connects this cam, at a point below the center or pivot on which the lever turns, with the transverse bar C, so that when the lever-handle is thrown forward the eccentric movement of the cam will push the bar C forward. The pressure of the bar C against the upper ends of the projecting teeth, which pass through the holes $d$, will rotate the bars B and throw the lower or harrowing ends of the teeth toward the rear. In this position the teeth will clean themselves by dragging over the ground. After they are cleaned they can be set vertical again by drawing the lever G to its upright position.

The lever-handle G curves downward upon itself, so that the driver can always reach it easily, whether it be thrown forward or back. This arrangement for shifting the position of the harrow-teeth is exceedingly simple and effective.

The link $j$, being connected with the cam portion of the lever below its center or pivot, will hold the harrow-teeth firmly in their harrowing position when the lever is thrown back.

Having thus described my invention, what I claim, and desire to secure by Letters Patent, is—

1. The harrow-frame A, having the tooth-carrying bars B journaled in its sides, said bars being connected by a transverse bar, C, through which the upper projecting ends of the middle tooth of each journaled bar passes, in combination with the cam or eccentric $h$, with its curved handle G, and the connecting-link $j$, substantially as specified.

2. In a harrow in which the teeth are held in journaled bars B, the connecting-bar C, with its funnel-shaped holes $d$ applied over the upper projecting end of the middle tooth of each bar, and connected by a link, $j$, with an eccentric, $h$, below the center or pivotal point about which the cam moves, substantially as specified.

In witness whereof I have hereunto set my hand and seal.

THOMAS J. HUBBELL. [L. S.]

Attest:
  EDWARD E. OSBORN,
  WM. F. CLARK.